United States Patent
Lochocki, Jr. et al.

(10) Patent No.: US 8,620,544 B2
(45) Date of Patent: Dec. 31, 2013

(54) METHOD AND APPARATUS FOR ENTERING NEUTRAL IDLE FROM A FORWARD DRIVE MODE

(75) Inventors: Ronald F. Lochocki, Jr., Ypsilanti, MI (US); Sindu Sebastian, Ann Arbor, MI (US); David W. Wright, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 796 days.

(21) Appl. No.: 12/565,952

(22) Filed: Sep. 24, 2009

(65) Prior Publication Data

US 2011/0071741 A1 Mar. 24, 2011

(51) Int. Cl.
*G06F 7/00* (2006.01)
(52) U.S. Cl.
USPC ............. 701/58; 701/51; 701/60; 701/61; 701/67; 74/730.1; 74/731.1; 192/3.28; 192/3.29; 192/3.3; 192/3.31; 477/168; 477/169; 477/107; 477/115
(58) Field of Classification Search
USPC ............ 477/166–181; 701/58–68; 475/275, 475/276, 123, 121, 118; 192/3.28–3.31; 74/730.1, 731.1
See application file for complete search history.

(56) References Cited

U.S. PATENT DOCUMENTS

| | | | |
|---|---|---|---|
| 5,272,630 A | 12/1993 | Brown et al. | |
| 6,411,881 B1 | 6/2002 | Thomas | |
| 6,634,984 B1 | 10/2003 | Doering et al. | |
| 7,509,202 B2 * | 3/2009 | Scelers | 701/65 |
| 2005/0003930 A1 * | 1/2005 | Hopper | 477/175 |
| 2009/0048060 A1 * | 2/2009 | Wittkopp et al. | 475/275 |
| 2010/0248896 A1 * | 9/2010 | Dreier | 477/118 |

* cited by examiner

*Primary Examiner* — John Q Nguyen
*Assistant Examiner* — Jordan S Fei
(74) *Attorney, Agent, or Firm* — Quinh Law Group, PLLC

(57) ABSTRACT

A transmission includes a plurality of clutches that are selectively engageable alone or in combination with each other to establish a plurality of forward drive modes, wherein one of the clutches is configured as a neutral idle (NI) clutch that is selectively actuated to shift the transmission into an NI state, and a controller. The controller is adapted to shift the transmission from a forward drive mode into the NI state during a coast-down maneuver prior to the transmission reaching a zero output speed. A method of shifting the transmission into the NI state includes determining the presence of a predetermined one of the forward drive modes using the controller, and using the controller to actuate a designated one of the clutches as an NI clutch to enter the NI state during the forward drive mode, during a coast-down maneuver, and prior to the transmission reaching a zero output speed.

17 Claims, 4 Drawing Sheets

METHOD AND APPARATUS FOR ENTERING NEUTRAL IDLE FROM A FORWARD DRIVE MODE

TECHNICAL FIELD

The present invention relates to the shift control of a vehicle transmission having neutral idle functionality.

BACKGROUND OF THE INVENTION

Vehicle transmissions are designed to transmit torque from an engine to a set of drive wheels in order to propel the vehicle within a range of output speeds. The engine includes an output shaft that may be selectively connected to a transmission input shaft when engine propulsion is required. In a manual transmission, a foot-operated clutch pedal may be actuated to allow a driver to shift gears and/or to place the transmission into a neutral state. In an automatic transmission, a hydrodynamic torque converter assembly or torque converter automatically provides the same engine/transmission connection.

A torque converter includes an impeller/pump, a turbine, and a stator. The torque converter is filled with oil. The pump, which may be bolted to a rotating flywheel portion of the engine to continuously rotate at engine speed, discharges the oil into the turbine. The turbine is connected to the transmission input shaft, so that any rotation of the turbine causes a rotation of the coupled transmission input shaft. A stator redirects oil discharged from the turbine back into the pump. The use of a torque converter thus enables a variable fluid coupling effect to occur automatically between the engine and the transmission, thereby allowing the vehicle to slow to a stop without stalling, while also allowing required torque multiplication to occur at low vehicle output speeds.

A torque converter may also include a lock-up torque converter clutch (TCC), a device configured to selectively lock the pump to the turbine above a calibrated threshold lockup speed. Below this lockup speed, an increasing amount of slip occurs across the torque converter as vehicle speed decreases, with a maximum slip level reached at zero vehicle speed. Regardless of whether a TCC is used, this variable slip capability allows the engine to continue to rotate when the vehicle is idling in certain transmission states or modes, e.g., in park (P), neutral (N), or in a drive state, i.e., a forward drive mode (D) or a reverse mode (R). In some transmission designs operating in a neutral (N) state during a drive detent position, i.e., when the vehicle reaches zero output speed at a standstill or when idling and the engine remains running, the transmission may be automatically shifted to a hydraulic neutral state referred to as neutral idle (NI).

SUMMARY OF THE INVENTION

Accordingly, a method and apparatus are provided for allowing a vehicle with an automatic transmission to enter a neutral idle (NI) state from a forward drive mode, e.g., first gear or a higher gear. The method of the invention is computer-executable, and may be embodied and stored as an algorithm in the memory of an onboard transmission shift controller. The method may be used in the control of a multi-speed transmission, e.g., a 6-speed or 8-speed transmission of various configurations as set forth herein, to provide a virtually imperceptible shift feel during a coast-down maneuver from the forward drive mode, and to provide an improved rate of idle fuel consumption.

In particular, a multi-speed automatic transmission includes a plurality of torque transfer mechanisms or clutches. One of the clutches designated as the NI clutch may be selectively actuated to enter the NI state from a forward drive mode during a coast-down maneuver. That is, NI is entered while the vehicle is coasting, but before the vehicle stops, and before torque converter-provided torque multiplication commences.

In one embodiment, the transmission may include at least four clutches which are selectively actuated, alone or in combination, to provide front wheel drive (FWD) or rear wheel drive (RWD) functionality. The NI clutch may be configured as a rotating clutch, and also configured as a $1^{st}$, $2^{nd}$, $3^{rd}$, and $4^{th}$ gear clutch. In another embodiment, the NI clutch may be configured as a braking clutch that is also configured as a reverse (R) and a $1^{st}$ gear clutch, although other clutch combinations are also possible.

The transmission may be electrically-controlled by a controller having an algorithm suitable for executing the method of the invention, as noted above. The algorithm automatically determines whether certain threshold NI state entry conditions are present. If so, the algorithm then determines if additional vehicle conditions are satisfied, e.g., if turbine speed is sufficiently close to engine speed, if a forward gear mode is presently commanded, and if a set of early NI entry abort conditions has or has not been satisfied, e.g., if turbine speed has dropped too low relative to a calibrated value. If all required NI conditions are met, the algorithm drops the designated NI clutch to a pre-learned operating pressure. The NI clutch is then controlled in closed-loop until the NI shift is complete, or until the NI state is exited.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
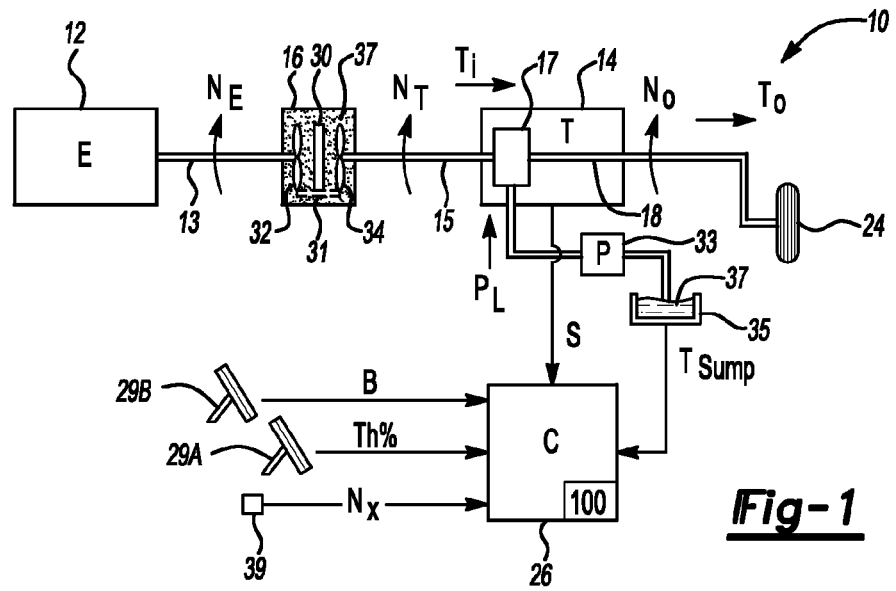
FIG. 1 is a schematic illustration of a vehicle having an automatic transmission and a neutral idle (NI) control method in accordance with the invention.

Referring to the drawings wherein like reference numbers correspond to like or similar components throughout the several figures, FIG. 1 shows a vehicle 10 having a controller (C) 26 and a neutral idle (NI) transmission shift control algorithm 100. The controller 26 is adapted for executing the algorithm 100 to directly enter the NI state during a coast-down maneuver from a forward drive mode. That is, the controller 26 may execute the algorithm 100 to enter the NI state before the vehicle 10 stops, and before any torque converter torque multiplication commences, as explained below.

The vehicle 10 includes an engine (E) 12 that is selectively coupled to an automatic transmission (T) 14 via a hydrodynamic torque converter assembly or torque converter 16. The engine 12 has an output shaft 13 which rotates at an engine speed ($N_E$), and the transmission 14 has an input shaft 15 which rotates at a turbine speed ($N_T$) as explained below. Transfer of an input torque ($T_i$) to the transmission 14 occurs at a variable rate through the torque converter 16.

The transmission 14 also includes an output shaft 18 connected to a set of road wheels 24. The output shaft 18 ultimately carries a transmission output torque ($T_o$) from various clutch and gear sets 17 of the transmission 14 to thereby propel the vehicle 10. A differential (not shown) may be included in the design without departing from the intended scope of the invention. In one embodiment, the clutch and gear sets 17 may be selectively actuated using electro-hydraulic controls powered by fluid from a pump (P) 33 at a line pressure ($P_L$). Pump 33 may be configured to draw fluid 37 from a sump 35, with the fluid having a temperature ($T_{Sump}$). However, other non-fluidic actuating means or devices may also be used within the scope of the invention.

The transmission 14 may be configured as a multi-speed transmission, e.g., a 6-speed or an 8-speed transmission, having NI state functionality as described above. As will be described in detail below with reference to FIGS. 2A-2C, the transmission 14 has a designated NI clutch that can be actuated to establish the NI state during a coast-down maneuver from a forward drive mode, i.e., $1^{st}$ gear or a higher forward drive gear.

In a neutral idle (NI) state, the transmission 14 may be in a drive (D) mode while electro-hydraulic clutch pressure regulation valves (not shown) reduce pressure on a designated NI clutch, thereby placing the transmission into a partially-loaded "hydraulic neutral" state as noted above. Data used by the algorithm 100 may reside within or may be accessible by the controller 26, and may be sampled/processed thereby during other transmission states such as neutral (N) and park (P).

Vehicle data that may be sampled in order to determine appropriate NI state entry conditions may include, but are not necessarily limited to: vehicle output speed ($N_O$), a value which may be measured by one or more sensors 39 shown separately in FIG. 1 for clarity, but which could also be positioned as needed within the vehicle 10, e.g., at or along the output shaft 18 and/or at the road wheels 24, etc; a throttle level (Th %) of a throttle input device such as an exemplary accelerator pedal 29A; a braking level (B) such as pedal position/travel and/or a braking force applied to brake pedal 29B; a PRNDL setting (S) of the transmission 14; a temperature ($T_{Sump}$) of the fluid 37 contained in the sump 35 of the transmission; onboard diagnostics; etc.

Still referring to FIG. 1, the engine 12 and the torque converter 16 are in communication with the controller 26, which is configured for storing and accessing the algorithm 100. The algorithm 100 in turn is specially adapted to execute the method of the invention as described below with reference to FIGS. 3 and 4. The controller 26 may be configured as a microprocessor-based device having such common elements as a microprocessor or CPU, memory including but not limited to: read only memory (ROM), random access memory (RAM), electrically-erasable programmable read-only memory (EEPROM), etc., and circuitry including but not limited to: a high-speed clock (not shown), analog-to-digital (A/D) circuitry, digital-to-analog (D/A) circuitry, a digital signal processor or DSP, and the necessary input/output (I/O) devices and other signal conditioning and/or buffer circuitry. However configured, the controller 26 is operable for executing at least the algorithm 100 of FIG. 3 as needed to provide entry in an NI state during a coast-down maneuver from a forward drive mode.

The controller 26 is adapted for receiving, reading and/or measuring, calculating, and recording or storing various required measurements, values, or figures including any required readings fully describing the engine speed ($N_E$), turbine speed ($N_T$), and the transmission output speed ($N_O$), such as via one or more speed sensors 39 having an output speed or speeds labeled generically as ($N_X$). The speed signals ($N_E$), ($N_O$) may be transmitted electrically via conductive wiring, although other transmitting means are also usable within the scope of the invention, for example radio frequency (RF) transmitters and receivers.

Figure 4:
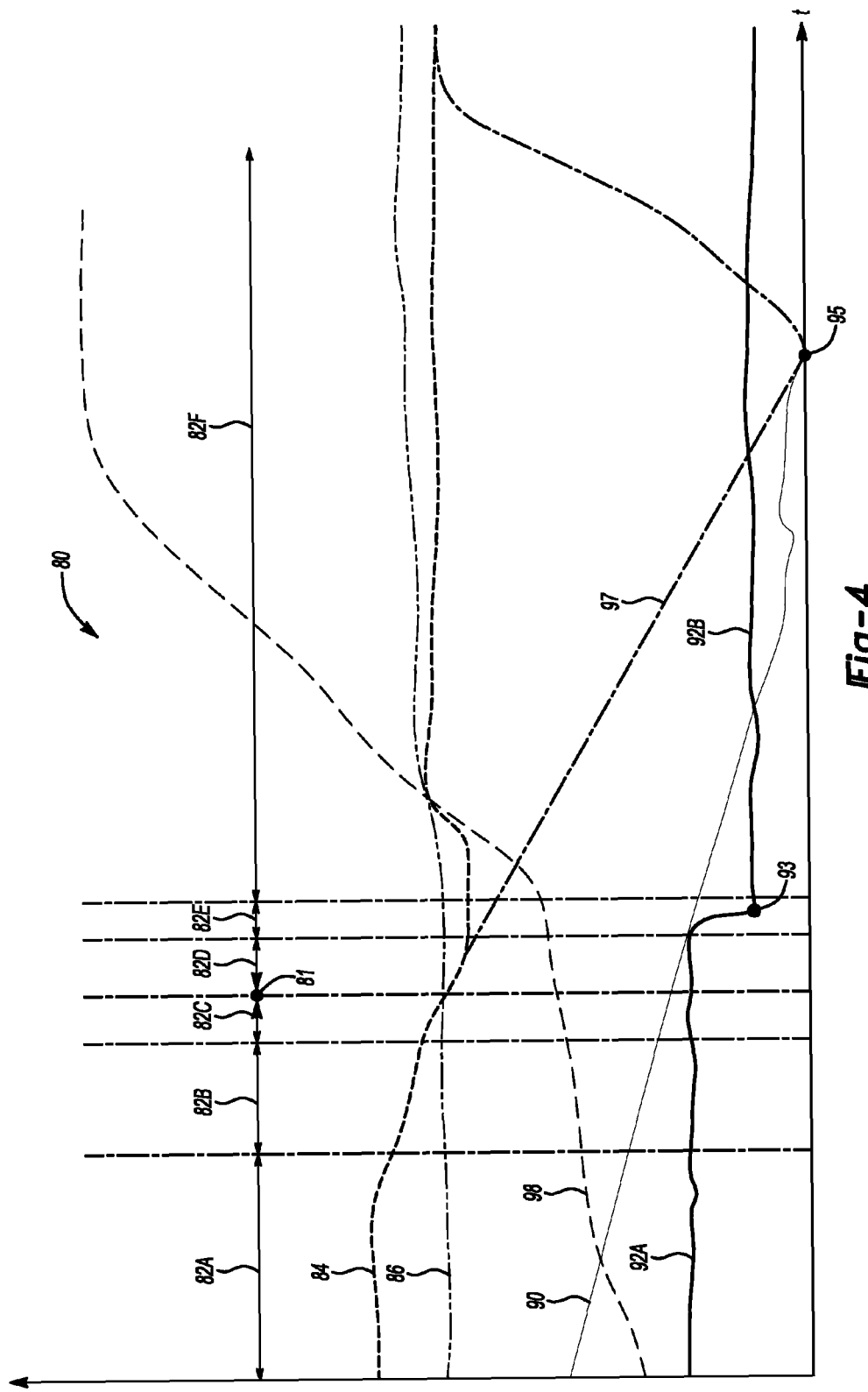
FIG. 4 is a time chart of a set of vehicle control signals used for controlling an NI shift in the vehicle shown in FIG. 1.

Still referring to FIG. 1, the torque converter 16 includes a stator 30 between a pump 32 and a turbine 34. A lockup torque converter clutch (TCC) 31 may also be used to selectively lock the pump 32 and turbine 34 above a threshold lockup speed. The pump 32 may be bolted or otherwise directly connected to the output shaft 13 to thereby rotate at engine speed ($N_E$). Within the torque converter 16, the turbine 34 is driven by fluid 37 and is connected to the input shaft 15 of the transmission 14. Thus, a rotation of the turbine 34 ultimately rotates the input shaft 15 at a turbine speed ($N_T$) less than or equal to engine speed ($N_E$). Viscous drag or friction losses occurring within the transmission 14 tend to reduce the turbine speed ($N_T$) to a level slightly less than engine speed ($N_E$) as shown in FIG. 4, and as understood by those of ordinary skill in the art.

Figure 2A:
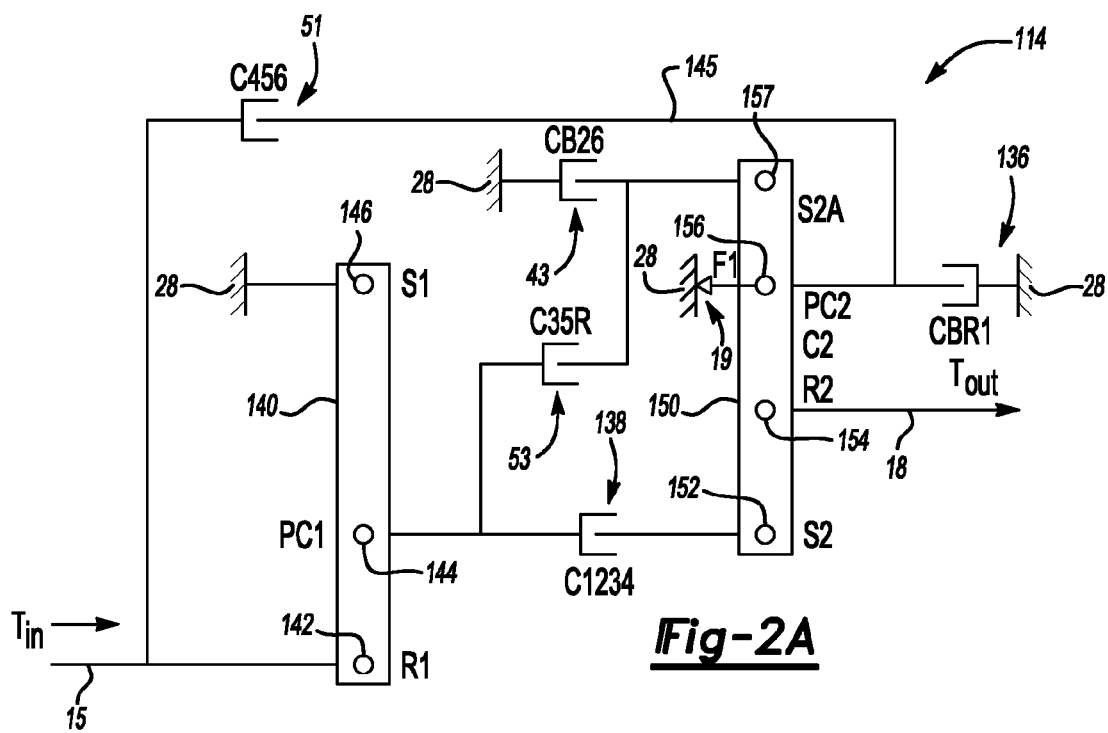
FIG. 2A is a lever diagram for one embodiment of the transmission shown in FIG. 1.

Referring to FIG. 2A, the transmission 14 of FIG. 1 is shown as a transmission 114 configured as a 6-speed transmission, which may be adapted for use as either a rear wheel drive (RWD) or a front wheel drive (FWD) transmission. Transmission 114 may include first and second gear sets 140 and 150, respectively; braking clutches CB26, i.e., clutch 43, and CBR1, i.e., clutch 136; and rotating clutches C35R, i.e., clutch 53, and C1234, i.e., clutch 138.

In the 6-speed embodiment of FIG. 2A, either of the following clutches noted above may be used to enter neutral idle (NI) from a forward drive mode: clutch CBR1, i.e., clutch 136 with freewheeling element (F1) 19 omitted, as noted below, and clutch C1234, i.e., clutch 138 with freewheeling element (F1) 19 optional, e.g., used to improve shift feel. For clutch 136, with freewheeling element (F1) omitted, the NI state may be entered from as high as 1st gear; for clutch 138, from as high as $4^{th}$ gear. When using clutch 138, a free-wheeling element (F1) 19 is used to prevent rotation with respect to node 156 of the second gear set 150.

The first gear set 140 may include nodes 142, 144, and 146, which in one possible embodiment may be a ring gear (R1), a carrier member (PC1), and a sun gear (S1), respectively. The input shaft 15 may be directly connected to node 142, and to an input side of clutch C456, i.e., clutch 51. Node 144 may be connected to an input side of clutch C1234, i.e., clutch 138, and to an input side of clutch C35R, i.e., clutch 53. Node 146 is grounded to the stationary member 28. As will be understood by those of ordinary skill in the art, as used in FIGS. 2A-C the term C1234, for example, refers to a clutch (C) used to establish each of $1^{st}$, $2^{nd}$, $3^{rd}$, and $4^{th}$ gear, i.e., the various forward drive modes that a clutch so labeled may be used to establish. Likewise, use of the letters B or R in the same clutch designation refers to a braking clutch and reverse gear, respectively.

Second gear set 150 includes nodes 152, 154, 156, and 157, which may be respectively embodied as a sun gear (S2), a ring gear (R2), a carrier gear (PC2), and another sun gear (S2A), respectively. Node 154 is directly connected to the transmission output shaft 18 and rotates at output speed ($T_{out}$). Node 156 is connected to an input side of clutch CBR1, i.e., clutch 136, which is also connected to stationary member 28.

As noted above, either of clutches 136 and 138 may be utilized as the designated NI clutch without departing from the intended scope of the invention. When using clutch 138, an optional free-wheeling mechanism (F1) 19 may be connected between stationary member 28 and node 156 to allow rotation with respect to node 156 in only one rotational direction. When using clutch 136 as the NI clutch, the free-wheeling mechanism 19 is omitted.

Figure 2B:
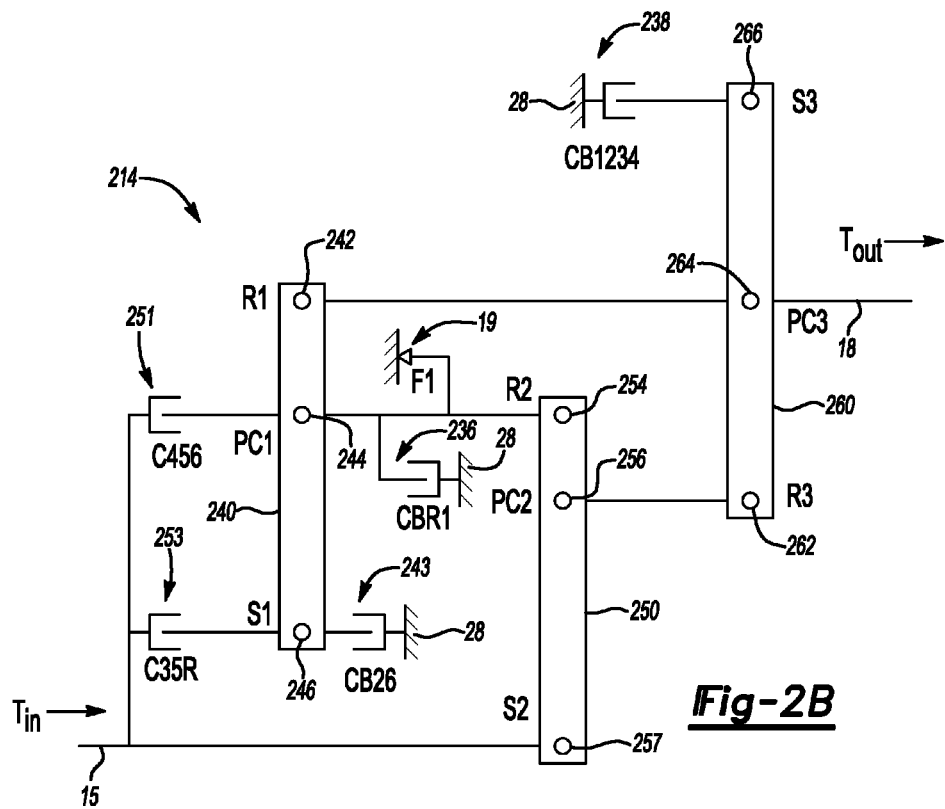
FIG. 2B is a lever diagram for another embodiment of the transmission shown in FIG. 1.

Referring to FIG. 2B, the transmission 14 of FIG. 1 is shown as a transmission 214 configured as a 6-speed transmission. Like the 6-speed transmission 114 of FIG. 2A, transmission 214 may be configured as either an FWD or an RWD transmission. Transmission 214 may include first, second, and third gear sets 240, 250, and 260, respectively; braking clutches CB26, i.e., clutch 243, CBR1, i.e., clutch 236, and CB1234, i.e., clutch 238; and rotating clutches C35R, i.e., clutch 253, and C456, i.e., clutch 251.

In the 6-speed embodiment of FIG. 2B, clutch CB1234, i.e., clutch 238, may be used to enter neutral idle (NI) from a forward drive mode. When using clutch 238, free-wheeling element (F1) 19 is used to prevent rotation with respect to node 254 of the second gear set 250. For C1234, the highest gear for early entry into the NI state is $4^{th}$ gear. CBR1 or clutch 236 may be used as the NI clutch if freewheeling element (F1) 19 is not present, with the highest gear for early entry into NI being $1^{st}$ gear in such an embodiment.

First gear set 240 may include nodes 242, 244, and 246, which in one possible embodiment may be a ring gear (R1), a carrier member (PC1), and a sun gear (S1), respectively. The input shaft 15 may be selectively connected to nodes 244 and 246 via clutches 251 and 253, respectively. Node 242 is directly connected to node 264 of the third gear set 260.

Second gear set 250 includes nodes 254, 256, and 257, which in one possible embodiment may be configured as a ring gear (R2), a carrier gear (PC2), and a sun gear (S2), respectively. Node 257 is directly connected to the transmission input shaft 15. Node 254 is connected to node 244 of the first gear set 240. Free-wheeling element (F1) 19 connects to stationary member 28 to allow rotation with respect to node 254 in only one rotational direction.

Third gear set 260 includes nodes 262, 264, and 266, which may be embodied as a ring gear (R3), a carrier gear (PC3), and a sun gear (S3), respectively. Node 266 is selectively connected to stationary member 28 via a clutch CB1234, i.e., clutch 238. Node 264 is connected to node 242 of the first gear set 240, and to the output shaft 18 of transmission 14. Node 262 is directly connected to node 256 of the second gear set 250.

Clutch 238, i.e., CB1234, may be utilized as the NI clutch in this particular embodiment as noted above. When using clutch 238, free-wheeling mechanism (F1) 19 may be connected between nodes 244 and 254 of gear sets 240 and 250, respectively, to allow rotation with respect to node 254 in only one rotational direction.

Figure 2C:
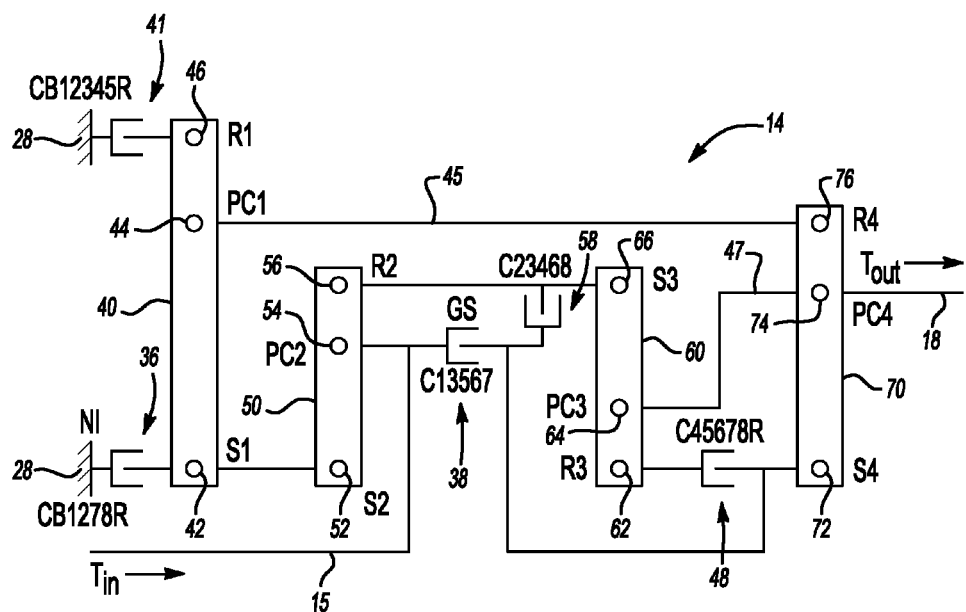
FIG. 2C is a lever diagram for yet another embodiment of the transmission shown in FIG. 1.

Referring to FIG. 2C, in yet another embodiment the transmission 14 shown in FIG. 1 may be configured as an 8-speed transmission having a plurality of gear sets and clutches, i.e., the clutches and gears 17 of FIG. 1. As with the transmissions of FIGS. 2A and 2B, transmission 14 may be adapted for use as either a FWD or a RWD transmission as desired. Transmission 14 may include a first, second, third, and fourth gear sets 40, 50, 60, and 70, braking clutches CB12345R, i.e., clutch 41, and CB1278R, i.e., clutch 36; and rotating clutches C13567, i.e., clutch 38, C23468, i.e., clutch 58, and C45678R, i.e., clutch 48.

In the 8-speed embodiment of FIG. 2C, any of the following clutches noted above may be used to enter neutral idle (NI) from a forward drive mode: clutch CB1278R, i.e., clutch 36; braking clutch CB12345R, i.e., clutch 41; and clutch C13567, i.e., clutch 38. For clutch 36, the NI state may be entered from as high as $2^{nd}$ gear; for clutch 41, as high as $5^{th}$ gear; and for clutch 38, as high as $1^{st}$ gear.

The first gear set 40 may include nodes 42, 44, and 46, which may be a sun gear (S1), a carrier gear (PC1), and a ring gear (R1), respectively. Node 46 may be selectively connected to stationary member 28 via a clutch CB12345R, i.e., clutch 41. Node 42 may be selectively connected to stationary member 28 via a clutch CB1278R, i.e., clutch 36. Node 42 is also connected to a node 52 of second gear set 50. Node 54 of gear set 50 is connected to an input side of a rotating clutch C13567, i.e., clutch 38, as is the transmission input shaft 15 with input torque ($T_{in}$). Node 56 is connected to a third gear set 60 as explained below.

The second gear set 50 may include nodes 52, 54, and 56, which may be a sun gear (S2), a carrier gear (PC2), and ring gear (R2), respectively. Node 52 may be directly connected to node 42 of gear set 40. Node 54 may be directly connected to the transmission input shaft 15.

The third gear set 60 may include nodes 62, 64, and 66, which may be a sun gear (S3), a carrier gear (PC3), and ring gear (R3), respectively. Node 66 may be directly connected to node 56 of the second gear set 50, and selectively connected to node 54 by a clutch C23468, i.e., clutch 58, and a clutch C13567, i.e., clutch 38.

The fourth gear set 70 may include nodes 72, 74, and 76, which may be a sun gear (S4), a carrier gear (PC4), and a ring gear (R4), respectively. Node 76 is directly connected to node 44 via a member 45. Node 74 is directly connected to the transmission output shaft 18, and directly connected to node 64 of the third gear set 60 via a member 47. Node 72 is selectively connected to node 62 via a clutch C45678R, i.e., clutch 48.

Figure 3:
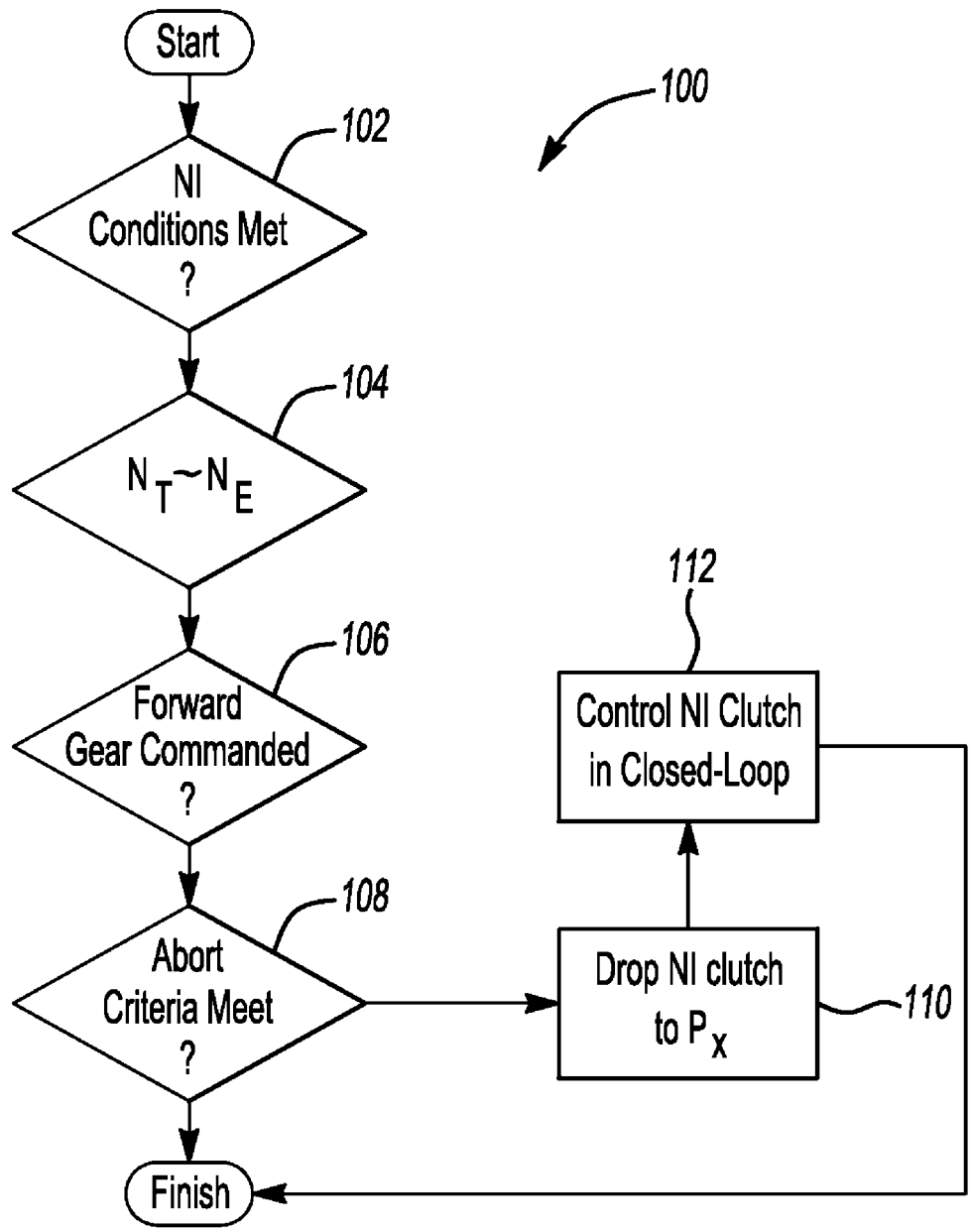
FIG. 3 is a graphical flow chart describing an algorithm suitable for executing the NI control method of the invention.

Referring to FIG. 3 in conjunction with the performance curves 80 of FIG. 4, the algorithm 100 provides the ability to enter the NI state during a coast-down maneuver, i.e., while the vehicle output speed ($N_O$) gradually decreases as the vehicle 10 of FIG. 1 coasts toward a standstill while in a forward drive gear as noted above. Such a coast-down maneuver is represented in FIG. 4 by the downward sloping line 90, with line 90 representing the output speed ($N_O$) of vehicle 10.

In the embodiment shown in FIG. 4, lines 82A-82F represent a command shift state, with line 82A corresponding to a commanded shift from a higher forward drive gear such as $3^{rd}$ gear, line 82B corresponding to operation in $2^{nd}$ gear, line 82C corresponding to a commanded shift to $1^{st}$ gear, line 82D corresponding to operation in $1^{st}$ gear, line 82E corresponding to a commanded shift to NI, and line 82F corresponding to operation in NI.

Execution of algorithm 100 during operation of the vehicle 10 of FIG. 1 allows the vehicle to enter the NI state well before the vehicle 10 coasts to a standstill, and well before torque multiplication commences via the torque converter 16. Execution of algorithm 100 thus allows early entry into the NI state to minimize driver or operator perception of the shift while optimizing idle fuel consumption.

Beginning with step 102, the vehicle 10 begins a coast-down maneuver while operating in a higher forward drive gear mode, as represented by command/state line 82A, the algorithm 100 determines whether certain threshold NI conditions are met. Threshold NI conditions may include, but are not necessarily limited to, a converter ratio (line 98), vehicle output speed line ($N_O$) 90, and, as shown in FIG. 1, the accelerator pedal position/throttle level (Th %), temperature ($T_{sump}$), brake pedal position (B), and/or other diagnostic values. If each threshold NI condition is met at step 102, the algorithm 100 proceeds to step 104, and otherwise exits. Upon exiting from any step disclosed herein, default shift control over the transmission 14 may be provided via other transmission control algorithms (not shown) depending on the design of the vehicle 10.

At step 104, the algorithm 100 determines whether turbine speed (line 84) is sufficiently close to engine speed (line 86). Sufficiency may be determined by way of a comparison of a calculated speed differential ($N_E$–$N_T$) to a calibrated value, e.g., to a maximum allowable variance between engine speed ($N_E$) and turbine speed ($N_T$). If the turbine speed (line 84) is determined to be sufficiently close to the engine speed (line 86), the algorithm 100 proceeds to step 106, otherwise exiting as noted above.

At step 106, the algorithm 100 determines whether a predetermined forward drive gear is actively commanded, e.g., whether the vehicle 10 is operating in a coast-down maneuver and shifting to NI from $1^{st}$ gear or higher according to one embodiment. If the predetermined forward gear is commanded, the algorithm 100 proceeds to step 108, otherwise exiting as noted above.

At step 108, the algorithm 100 evaluates a set of abort criteria, and if certain threshold abort conditions are met, the algorithm exits as noted above. Otherwise, the algorithm 100 proceeds to step 110. Within the scope of the invention, abort criteria may be stored in memory aboard the controller 26 as calibrated values, with the calibrated values possibly varying depending on the design of the vehicle 10. In one embodiment, the abort criteria may include a determination of whether turbine speed ($N_T$) (line 84) has dropped too low to warrant continued execution of the algorithm 100, such as by comparing the turbine speed ($N_T$) to a calibrated threshold value.

At step 110, and commencing at approximately point 81, the algorithm 100 drops the initial pressure of the NI clutch to its pre-learned pressure, i.e., the NI clutch pressure drops from a pre-engaged level (line 92A) to the level of line 92B. The position of point 81 in FIG. 4 depends on the forward gear from which the NI state is entered, e.g., point 81 would move left in FIG. 4 if entering the NI state from $2^{nd}$ gear. The transition to the pre-learned pressure is complete at point 93. The algorithm 100 then proceeds to step 112.

At step 112, the algorithm 100 controls the NI clutch in a closed-loop manner, as indicated by the relatively constant value of line 92B to the right of point 93. Once step 112 is complete, the algorithm 100 is finished, and the NI state is maintained until the controller 26 of FIG. 1 determines that the vehicle 10 of that figure is being commanded to leave the NI state, e.g., upon an up-shift to a forward drive gear from the NI state as the vehicle accelerates.

Algorithm 100 therefore allows the transmission 14 to be shifted into NI during a coast-down maneuver well in advance of the vehicle 10 reaching a standstill, i.e., point 95, and prior to torque multiplication. Turbine speed (line 84) is pulled down and settles at a value just below that of engine speed (line 86). Conventionally, turbine speed is pulled down to zero at point 95, as indicated by trace 97, before settling at a level just below engine speed (line 86). This cycling of turbine speed, as indicated by trace 97, may be perceived by a driver or passenger of the vehicle 10, potentially affecting the perceived shift quality. Likewise, entry into NI at point 93 rather than point 95 may provide a reduction in idle fuel consumption.

While the best modes for carrying out the invention have been described in detail, those familiar with the art to which this invention relates will recognize various alternative designs and embodiments for practicing the invention within the scope of the appended claims.

The invention claimed is:

1. A transmission for a vehicle having a torque converter, the transmission comprising:
   a plurality of clutches that are selectively engageable, alone or in combination with each other, to establish a plurality of forward drive modes, wherein one of the plurality of clutches is also designated as a neutral idle (NI) clutch that is selectively actuated to shift the transmission into an NI state while in one of the forward drive modes; and
   a controller adapted to determine when torque multiplication via the torque converter will occur, and to shift the transmission from one of the forward drive modes directly into the NI state during a coast-down maneuver prior to the transmission reaching a zero output speed and before the torque multiplication occurs, wherein the controller selectively reduces hydraulic pressure to the designated NI clutch as part of the shift.

2. The transmission of claim 1, wherein the NI clutch is a braking clutch, and wherein the controller is adapted to shift the transmission from one of: first gear and second gear.

3. The transmission of claim 1, wherein the plurality of clutches includes at least two braking clutches and at least two rotating clutches.

4. The transmission of claim 3, wherein the plurality of clutches includes two rotating clutches and three braking clutches, and wherein the NI clutch is one of the three braking clutches.

5. The transmission of claim 3, further comprising a planetary gear set and a free-wheeling element, wherein the free-wheeling element is adapted for allowing rotation of a member of the planetary gear set in only one rotational direction, and wherein the NI clutch is one of the rotating clutches allowing a shift to the NI state from fourth gear.

6. The transmission of claim 1, wherein the controller includes a predetermined set of abort criteria, and wherein the controller is adapted to default to a default NI entry mode when the abort criteria are met.

7. The transmission of claim 6, wherein the default NI entry mode includes a transition into the NI state when the output speed reaches zero.

8. A transmission for a vehicle having a torque converter, the transmission comprising:
   a plurality of clutches that are selectively engageable, alone or in combination with each other, to establish a plurality of forward drive modes, including first gear and second gear, wherein one of the clutches is also configured as a neutral idle (NI) clutch that is selectively actuated to cause the transmission to directly enter an NI state while in one of the plurality of forward drive modes; and
   a controller adapted to determine when torque multiplication via the torque converter will occur, and to transition the transmission into the NI state during a coast-down maneuver from first gear or second gear prior to the transmission reaching a zero output speed and before the torque multiplication occurs, wherein the controller is configured to selectively reduce hydraulic pressure to the designated NI clutch as part of the transition into the NI state;

wherein the transmission is configured as one of a 6-speed transmission and an 8-speed transmission.

9. The transmission of claim 8, wherein the transmission is the 6-speed transmission and includes at least two planetary gear sets, at least two braking clutches, and at least three rotating clutches, and wherein the NI clutch is one of the braking clutches.

10. The transmission of claim 9, wherein the transmission is the 8-speed transmission and includes four planetary gear sets, at least two braking clutches, and at least three rotating clutches.

11. The transmission of claim 8, wherein the controller is adapted for holding the NI clutch at a pre-learned NI pressure when the NI clutch is engaged, and for controlling the NI clutch in a closed-loop during the NI state.

12. The transmission of claim 11, wherein the controller includes a predetermined set of abort criteria, and wherein the controller is adapted to default to a default NI entry mode when the abort criteria are met.

13. A method for shifting a transmission of a vehicle having a torque converter into a neutral idle (NI) state, the transmission having a plurality of clutches that are selectively engageable, alone or in combination with each other, to establish a plurality of forward drive modes, the method comprising:

determining when torque multiplication via the torque converter will occur;

determining the presence of a predetermined one of the forward drive modes using a controller; and actuating a designated one of the clutches as an NI clutch using the controller to thereby directly enter the NI state from the predetermined forward drive mode, including reducing hydraulic pressure to the designated NI clutch;

wherein entry into the NI state occurs during a coast-down maneuver of the vehicle prior to the transmission reaching a zero output speed and before the torque multiplication occurs.

14. The method of claim 13, wherein the plurality of clutches includes at least two rotating clutches and two braking clutches, and wherein actuating a designated one of the clutches includes actuating one of the two braking clutches.

15. The method of claim 13, wherein the transmission includes a planetary gear set and a free-wheeling element adapted for allowing rotation of a member of the planetary gear set in only one rotational direction, and wherein actuating a designated one of the clutches includes actuating a rotating clutch.

16. The method of claim 13, wherein the torque converter includes a turbine, the method further comprising:

determining whether a speed differential between a speed of the turbine and a speed of an engine of the vehicle is within a maximum allowable variance, and preventing a transition into the NI state when the speed differential is not within the maximum allowable variance.

17. The method of claim 13, further comprising: determining whether a set of NI conditions has been satisfied, and preventing a transition into the NI state from the forward speed mode when the set of NI conditions has not been satisfied.

* * * * *